(12) United States Patent
Ofek et al.

(10) Patent No.: US 6,356,977 B2
(45) Date of Patent: Mar. 12, 2002

(54) SYSTEM AND METHOD FOR ON-LINE, REAL TIME, DATA MIGRATION

(75) Inventors: Yuval Ofek, Framingham; Moshe Yanai, Brookline, both of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/735,023

(22) Filed: Dec. 12, 2000

Related U.S. Application Data

(63) Continuation of application No. 09/363,482, filed on Jul. 29, 1999, now Pat. No. 6,240,486, which is a continuation of application No. 08/807,331, filed on Feb. 28, 1997, now Pat. No. 6,108,748, which is a continuation-in-part of application No. 08/522,903, filed on Sep. 1, 1995, now Pat. No. 5,680,640.

(51) Int. Cl.[7] .............................................. G06F 12/06
(52) U.S. Cl. ...................... 711/112; 711/165; 711/162; 714/7; 709/217; 709/219
(58) Field of Search ................................ 711/112, 114, 711/161, 162, 165, 111, 163; 714/6, 7, 8; 712/20; 709/217, 219, 226

(56) References Cited

U.S. PATENT DOCUMENTS

| | | | |
|---|---|---|---|
| 3,771,137 A | 11/1973 | Barner et al. ................ 711/120 |
| 4,638,424 A | 1/1987 | Beglin et al. ................ 711/117 |
| 4,771,375 A | 9/1988 | Beglin et al. ................ 711/117 |
| 4,823,333 A | 4/1989 | Satoh et al. .................... 369/84 |
| 4,974,156 A | 11/1990 | Harding et al. ............. 711/162 |
| 5,101,492 A | 3/1992 | Schultz et al. .................. 714/7 |
| 5,260,990 A | 11/1993 | MeLampy et al. ........ 379/88.26 |
| 5,269,011 A | 12/1993 | Yanai et al. ................. 710/100 |
| 5,367,698 A | 11/1994 | Webber et al. .............. 709/203 |
| 5,381,539 A | 1/1995 | Yanai et al. ................. 711/133 |
| 5,392,244 A | * 2/1995 | Jacobson et al. ........... 711/114 |
| 5,435,004 A | 7/1995 | Cox et al. .................... 707/205 |

(List continued on next page.)

FOREIGN PATENT DOCUMENTS

WO          9523376          8/1995

OTHER PUBLICATIONS

"Page Recovery Using Multiple Logs in a Data Sharing Environment", IBM Technical Disclosure Bulletin (IBM–TDB), vol. 33, pp. 268–272, Aug. 1990.*

"Dynamic Page Storage Migration in Virtual Storage Systems", IBM Technical Disclosure Bulletin (IBM–TDB) vol. 18, pp. 2584–2585, Jan. 1976.*

(List continued on next page.)

*Primary Examiner*—Matthew Kim
*Assistant Examiner*—Pierre-Michel Bataille
(74) *Attorney, Agent, or Firm*—George A. Herbster

(57) ABSTRACT

A system and method for providing on-line, real-time, transparent data migration from an existing storage device to a replacement storage device. The existing and replacement storage devices are connected as a composite storage device that is coupled to a host, network or other data processing system. The replacement storage device includes a table which identifies data elements that have migrated to the replacement storage device. When a host system makes a data transfer request for one or more data elements, the replacement storage device determines whether the data elements have been migrated. If the data elements have migrated, the replacement storage device responds to the data transfer request independently of any interaction with the existing storage device. If the data elements have not migrated, the replacement storage device migrates the requested data elements and then responds to the data request and updates the data element map or table. When not busy servicing other requests, the replacement storage device operates in a background mode to migrate data elements so the data migration can occur concurrently with and transparently to system operations.

18 Claims, 13 Drawing Sheets

U.S. PATENT DOCUMENTS

| | | | |
|---|---|---|---|
| 5,459,857 A | | 10/1995 | Ludlam et al. ............... 714/6 |
| 5,479,654 A | | 12/1995 | Squibb ...................... 707/201 |
| 5,493,607 A | | 2/1996 | Arumainayagam et al. ...... 379/88.18 |
| 5,497,483 A | | 3/1996 | Beardsley et al. ............. 714/1 |
| 5,506,986 A | | 4/1996 | Healy ........................ 707/204 |
| 5,522,031 A | | 5/1996 | Ellis et al. .................... 714/6 |
| 5,535,381 A | | 7/1996 | Kopper ........................ 710/52 |
| 5,537,585 A | | 7/1996 | Blickenstaff et al. ....... 707/205 |
| 5,544,347 A | * | 8/1996 | Yanai et al. ................ 711/162 |
| 5,555,371 A | | 9/1996 | Duyanovich et al. ......... 714/13 |
| 5,564,037 A | | 10/1996 | Lam .......................... 711/161 |
| 5,574,950 A | | 11/1996 | Hathorn et al. ............... 710/8 |
| 5,592,432 A | | 1/1997 | Vishlitzky et al. ..... 365/230.03 |
| 5,680,640 A | | 10/1997 | Ofek et al. ................... 710/19 |
| 5,689,732 A | | 11/1997 | Kondo ........................ 710/64 |
| 5,706,467 A | | 1/1998 | Vishlitzky et al. .......... 711/129 |
| 5,734,813 A | | 3/1998 | Yamamoto et al. ............ 714/6 |
| 5,742,792 A | | 4/1998 | Yanai et al. ................ 711/162 |
| 5,835,954 A | | 11/1998 | Duyanovich et al. ....... 711/162 |
| 5,909,483 A | * | 6/1999 | Weare et al. ............ 379/88.18 |
| 6,108,748 A | | 8/2000 | Ofek et al. ................. 711/112 |

OTHER PUBLICATIONS

Output Space Threshold and Alternate Output Volumes for DASD Migration Aid, IBM Technical Discloure Bulletin, vol. 27, pp. 6469–6471, Apr. 1985.*

"Full Volume Migration", IBM Technical Disclosure Bulletin, vol. 37, 297–298, Sep. 1994.*

"Data Migration and Staging Facility", IBM Technical Disclosure Bulletin, vol. 16, pp. 205–208, Jun. 1973.*

J. A. McCann et al. *Dynamic File Migration to Support Parallel Database Systems*, IEEE, pp. 352–356, 1995.

Cheong Youn et al. *Data Migration*, IEEE, pp. 1255–1258, 1992.

Nancy C. Ramsay, *Integration of the Optical Storage Processor and the DBC/1012 Data Base Computer*, IEEE, pp. 94–97, 1990.

E. Thanhardt et al. *File Migration in the Near Mass Storage System*, IEEE, pp. 114–121, 1988.

R. T. Hurley et al. *Potential Benefits of File Migration in a Heterogenous Distributed File System*, IEEE, pp. 123–127, 1993.

* cited by examiner

| IN CACHE | | WRITE PENDING | OTHER | NEW ADDRESS | NEED MIGRATION |
|---|---|---|---|---|---|
| DEVICE X | | | | | |
| VOLUME 1 | X | X | | ... | YES |
| TRACK 1 | X | X | | | YES |
| TRACK 2 | | X | | ... | YES |
| ... | | | | | NO |
| TRACK N | | | | | YES |
| VOLUME 2 | | ... | | ... | YES |
| ... | | | | | ... |

DATA MAP/TABLE

FIG. 2

SYSTEM AND METHOD FOR ON-LINE, REAL TIME, DATA MIGRATION

CROSS-REFERENCE TO RELATED APPLICATION

This is a continuation of U.S. application Ser. No. 09/363,482 filed Jul. 29, 1999 (now U.S. Pat. No. 6,240,486 which is a continuation of U.S. application Ser. No. 08/807,331, (U.S. Pat. No. 6,108,748) a continuation-in-part of co-pending application for U.S. Pat. No. 08/522,903 filed Sep. 1, 1995 for a System and Method for On-Line, Real Time, Data Migration, (now U.S. Pat. No. 5,680,640 issued Oct. 21, 1997).

BACKGROUND OF THE INVENTION

1. Field of the Invention

This invention relates to data storage systems and more particularly, to a system and method for on-line replacement of an existing data storage subsystem.

2. Description of Related Art

Data processing centers of businesses and organizations such as banks, airlines and insurance companies, for example, rely almost exclusively on their ability to access and process large amounts of data stored on a data storage device. Data and other information which is typically stored on one or more data storage devices which form part of a larger data storage system is commonly referred to as a database.

Databases are nearly always "open" and constantly "in use" and being accessed by a coupled data processing system, central processing unit (CPU) or host mainframe computer. The inability to access data is disastrous if not a crisis for such business and organizations and will typically result in the business or organization being forced to temporarily cease operation.

During the course of normal operations, these businesses and organizations must upgrade their data storage devices and data storage systems. Although such upgrading sometimes includes only the addition of data storage capacity to their existing physical systems, more often than not upgrading requires the addition of a completely separate and new data storage system. In such cases, the existing data on the existing data storage system or device must be backed up on a separate device such as a tape drive, the new system installed and connected to the data processing unit, and the data copied from the back-up device to the new data storage system. Such activity typically takes at least two days to accomplish. If the conversion takes more than two days or if the business or organization cannot withstand two days of inoperability, the need and desire to upgrade their data storage system may oppose an insurmountable problem.

Some prior art data copying methods and systems have proposed allowing two data storage systems of the same type, a first system and a second system, to be coupled to one another, and allowing the data storage systems themselves to control data copying from the first to the second system without intervention from or interference with the host data processing system. See for example, the data storage system described in U.S. patent application Ser. No. 08/052,039 entitled REMOTE DATA MIRRORING, fully incorporated herein by reference, which describes one such remote data copying facility feature which can be implemented on a Symmetrix 5500 data storage system available from EMC Corporation, Hopkinton, Mass.

Although such a system and method for data copying is possible, in most instances, the first and second data storage systems are not of the same type, or of a type which allow such a "background" data migration to take place between the two data storage systems, unassisted by the host and while the database is open. Additionally, even on such prior art data storage systems, migrating data as a "background" task while the database is "open" does not take into account the fact that the data is constantly changing as it is accessed by the host or central processing unit and accordingly, if the old system is left connected to the host, there will always be a disparity between the data which is stored on the old data storage system and the data which has been migrated onto the new data storage system. In such cases, the new data storage system may never fully "catch up" and be able to be completely synchronized to the old data storage system.

Accordingly, what is needed is a system and method for allowing data migration between a first data storage system and a second data storage system while the database is open and in real-time, completely transparent to the host or data processing unit.

SUMMARY

This invention features a system and method for providing on-line, real-time, transparent data migration between two data storage devices. The system includes a first data storage device which was previously coupled to an external source of data including a data processing device such as a host computer, or a network which may be connected to a number of data processing devices such as a number of host computers. The data processing device such as a host computer reads data from and writes data to the data storage device. The first data storage device initially includes a plurality of data elements currently being accessed by the data processing device.

At least one second data storage device is provided which is coupled to the first data storage device and to the data processing device, for storing data elements to be accessed by the data processing device. The second data storage device preferably includes a data element map including at least an indication of whether or not a particular data element is stored on the second data storage system.

In one embodiment, the second data storage system independently migrates data from the first to the second data storage system independent of the source. In another embodiment, the second data storage system is responsive to the external source, for migrating data from the first to the second data storage system.

In yet another embodiment, the data processing device issues a data read request (in the case of a read data operation), or a data write command (in the case of a write operation). The request is received by the second data storage device. In the case of a read operation, second data storage device examines the data map or table to determine whether or not the data has been migrated to and is stored on the second data storage device. If it is determined that the data is stored on the second data storage device, the data is made available to the requesting device.

If the data is not stored on the second data storage device, the second data storage device issues a data request, in the form of a read data command, to the first data storage device, obtains the data and makes the data available to the requesting device. The data received from the first data storage device is also written to the second data storage device and the data map updated.

In the case of a write operation, one embodiment contemplates that if the data received from the data processing device is destined for a location on the data storage system that has not yet been copied or 'migrated' from the older or first data storage device (a data storage location marked in the data map as 'need to migrate'), and the data is not a full or complete data element (for example, not a 'full track' of data) the write operation is suspended, the "complete" data element from the corresponding location (a "full track" for example) on the first data storage device is read into the cache memory on the second data storage device, the in-cache flag or bit set, the data storage location marked or identified as 'write pending', and the write operation resumed meaning that the data will be 'written' to and over the 'full track' of data now stored in the cache memory of the second data storage system. In other embodiments, the older data may not be retrieved from the first or older data processing device if the new data to be written is known to be a complete data element (a 'full track' for example).

When the second data storage device is not busy handling data read or write requests from a coupled data processing device, such as a host computer, the second data storage system examines its data map/table to determine which data elements are resident on the first data storage device and are not stored on the second data storage device. The second data storage device then issues read requests to the first data storage device requesting one or more of those data elements, receives the data, writes the data to the second data storage device and updates the data map/table to indicate that the data is now stored on the second data storage device.

In this manner, there is no need to perform time consuming off-line data migration between first and second data storage devices but rather, the data copying or migration can occur in real-time, while the data storage devices are on-line and available to the host or other requesting device, and completely transparent to the coupled data processing device.

In the preferred embodiment, the second data storage device further includes or is coupled to a data storage device system configuration device, such as a computer, which provides configuration data to the data element map or table on the second data storage device, allowing the second data storage device to be at least partially configured in a manner which is generally similar or identical to the first data storage device.

Additionally, the preferred embodiment contemplates that the second and first data storage devices are coupled by a high speed communication link, such as a fiber optic link employing the "ESCON" communication protocol. The preferred embodiment also contemplates that the data storage device includes a plurality of data storage devices, such as disk drives. In this case, data elements may include one or more of a disk drive volume, track or record.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 2 is a schematic illustration of a data element map or table;

DESCRIPTION OF ILLUSTRATIVE EMBODIMENTS

The present invention features a system and method for providing on-line, real-time, transparent data migration between two data storage systems, at least one of which is coupled to a data processing device such as a host computer.

Figure 1:
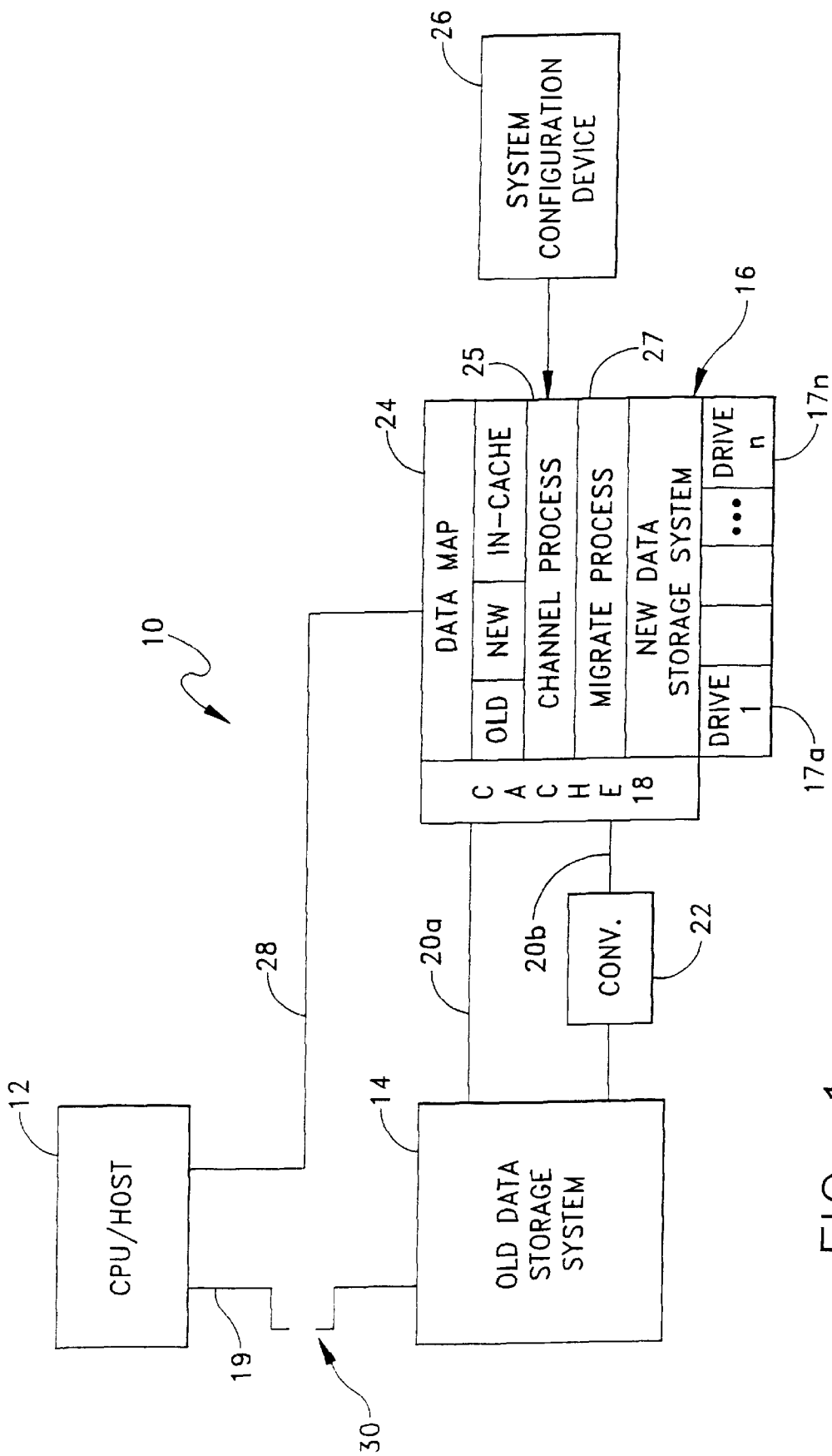
FIG. 1 is a schematic diagram of an exemplary data processing and data storage system on which the system and method for providing on-line, data transparent data migration between first and second data storage systems in accordance with the present invention may be accomplished.

An exemplary system 10, FIG. 1 on which the present invention may be performed and implemented includes a host computer, central processing unit or other similar data processing device 12. The data processing device 12 is initially coupled to a first data storage system 14. In most instances, the first data storage system 14 is an older data storage system which is either not large enough to handle the needs of the data processing device 12, or for some other reason is going to be completely or partially replaced or augmented by the addition of a second data storage system 16.

The first data storage system 14 is initially coupled to the data processing device 12 by means of a data communication link 19. The second data storage system 16 is coupled to the first data storage system 14 by means of one or more data communication paths 20a, and/or 20b. Examples of data communication paths 20a–20b include an IBM "bus and tag" connection well known to those skilled in the art, and higher speed fiber optic connections such as an ESCON data connection.

If the first and second data storage systems 14, 16 have an incompatible data communication protocol or interface, a protocol converter 22 may be provided on one or more of the data communication links 20a, 20b as required, and as is well known in the art.

The second data storage system 16 includes a data map or table 24 of data elements which are stored on at least the second data storage system 16. The data map or table is established during the set-up or configuration of the second data storage system 16 and is dependent on the particular configuration of the second data storage system 16.

Preferably, the data map/table 24 also includes information about data elements which are stored in the first data storage system 14, the use of such a data map/table will be explained in greater detail below.

The second data storage system 16 is typically and preferably coupled to a data storage system configuration device 26 such as a computer, which allows the user to configure the second data storage system 16 and the data map/table 24 as desired by the user. In the preferred embodiment, the second data storage system 16 is at least partially configured exactly as the first data storage system 14 is configured in terms of the number of logical devices, storage size, storage system type (3380/3390, for example) etc.

In the preferred embodiment, the data storage system configuration device 26 allows the user to configure at least a portion of the data storage area on second data storage system 16 to include data element storage locations or addresses which correspond to data element storage addresses on the first data storage system 14.

In the preferred embodiment, the second data storage system 16 is a disk drive data storage system employing a large number of fixed block architecture (FBA) formatted disk drives 17a–17n, and adapted for storing large amounts of data to be accessed by a host computer or other data processing device 12. The exemplary second data storage system 16 also typically includes a cache memory 18 which serves to hold or buffer data read and write requests between the second data storage system 16 and the host or other data processing device 12. Such data storage systems are well known to those skilled in the art and include, for example, the Symmetrix 5500 series data storage system available from EMC Corporation, Hopkinton, Mass., a description of which is incorporated herein by reference.

Initially, the second or new data storage system 16 is first coupled to the first data storage system 14 by means of one or more data communication links or paths 20a, 20b. After the second data storage system 16 has been configured using a system configuration device 26 or other similar or equivalent device, or by the host 12, the second data storage system 16 is coupled to the host computer 12 or other data processing device by means of a data communication path 28.

Preferably, data communication path 28 is a high speed communication path such as a fiber optic "ESCON" communication path, although any and all other communication paths are considered to be within the scope of the present invention. Immediately before connecting data communication path 28 between the host or other data processing unit 12 in the second data storage system 16, the previously existing data communication path 18 between the host 12 and the first data storage system 14 is disconnected or severed as illustrated at arrow 30.

Thus, in contrast with the prior art whereby the host or other data processing system 12 must be taken off line for a number of days in order to allow for backing up of data on the first data storage system 14 followed by the replacement of the first data storage system 14 with a second data storage system 16 and subsequent copying of all of the data onto the new data storage system 16, or a host which remains coupled to the original 'first' data storage system 14, the present invention only requires the host computer or other data processing device 12 to be off line or service interrupted for a relatively short period of time (the procedure typically takes approximately 10 minutes or less), while the first data signal path 19 is severed or disconnected and the second data signal path 28 is established between the second or new data storage system 16 and the host computer or other data processing device 12.

Accordingly, after the second data storage system 16 has been connected to the host or other data processing unit 12, whenever the host or data processing unit 12 issues a request to read data from or write data to "its" data storage system, the request is received by the second data storage system 16. Using a bit or flag from the data map/table 24 previously established and configured, the second data storage system 16, by scanning data maptable 24, determines whether or not the data requested (in the case of a read operation) is stored on the first data storage system 14 or on the second data storage system 16.

Such a hierarchical data map/table 24 is further explained and exemplified herein as well as in U.S. Pat. Nos. 5,206,939 and 5,381,539 assigned to the assignee of the present invention and both fully incorporated herein by reference.

If the data is already stored in the second data storage system 16, the second data storage 16 retrieves the data (perhaps temporarily storing the data in cache memory 18) as is well known in the art, and makes the data available to the host or other requesting data processing device 12.

If the requested data is not on the second data storage system 16, channel or real-time data handling process 25 of the second data storage system 16 issues a read data request to the first data storage system 14 in the manner and format native or known to the first data storage system 14 (for example, standard IBM data read commands) Channel or real-time data handling process 25 is, in the preferred embodiment, a software program comprising a series of commands or instructions which receives one or more commands from the second data storage system interface to the host or CPU (typically called a "channel"), interprets those commands, and issues one or more corresponding commands which can be acted upon by the first data storage system. Such an 'interpreter' type of software is well known to those skilled in the art.

The first data storage system 14 then retrieves the requested data and provides it to the second data storage system 16. The second data storage system 16 then makes the data available to the host or other data processing unit 12 which has requested the data.

Since the second data storage system now has a copy of the data, the data will be written to the second data storage system 16 and the appropriate data map/table 24 flags or bits updated to indicate that the data has been migrated to the second data storage system 16 so that next time the same data element is requested, the second data storage system 16 will have the data already stored on the system and will not have to request it from the first data storage system.

Further, as will be explained in greater detail below, the second data storage system 16 can perform a "background" data migration procedure or process 27. The "background" data migration procedure of process 27 is, in the preferred embodiment, a software program including a series on instructions which coordinate, monitor and control data migration whereby whenever the second data storage system is not busy handling data input/output requests from the host or other data processing device 12, the migrate process 27 of the second data storage system 16 determines which data on the first data storage system has not been copied by reading a specified flag or bit in its data table/map 24, and copies or "migrates" the data from the first data storage system 14 to the second data storage system 16 completely transparent to the host 12, and often in parallel with the channel process 25 which may be retrieving data from the first data storage system 14 in response to requests from the host or CPU 12, while maintaining full accessibility to the data by the host or other data processing device 12.

An exemplary data element map/table 24 is shown in greater detail in FIG. 2. In the preferred embodiment, the data map/table 24 is organized in a hierarchical fashion. For example, for the preferred embodiment wherein the data storage system includes a plurality of longer term data storage devices such as disk drives 17a–17n, and wherein each disk drive is partitioned into one or more logical "volumes" and each volume comprises a number of disk drive tracks, the data map/table 24 will first have an entry 50 for each physical and/or logical device such as a disk drive.

The device entry 50 will be followed by an entry 52 for a first logical volume, followed by one or more entries 54a–54c for each track of the device which comprises the logical volume 52. The entries 52, 54a–54c for the first logical will be followed by entry line 56 for the second logical volume configured on the physical device indicated by the entry at line 50.

All information about the data storage system and each device in the data storage system with the exception of the "data in cache" indication flag or bit 58 is stored in hierarchical format in the data map/table 24. Thus, whenever the second data storage system 16 desires or needs to obtain information about a particular data element (be it an individual data record, track or volume), the data storage system 16 scans the data map/table 24 beginning at the device level 50 to determine whether or not the desired criterion or characteristic has been established for any track or volume of a device.

There will be a 'flag' or other similar indicator bit set, or other indication of the desired characteristic in the device entry 50, in the volume entry 52 and in the appropriate track entry 54 if the desired characteristic is found in that portion of the data storage device represented by the data map/table 24.

For example, the preferred embodiment of a data map/table 24 includes a write pending flag or bit 61 which is set if a particular data element is presently stored in cache 18 of the second data storage system 16 and must be written to longer term storage such as a disk drive 17a–17n. For exemplary purposes, assuming that track 2 of volume 1 is in cache 18 in the second data storage system 16 and write pending, the write pending flag or bit 61 and the in cache bit 58 at line entry 54b (for track two) will be set, as will the write pending bit 61 of volume 1 at line 52 of the data map/table 24, as will the write pending bit 61 of the device at line 50.

Thus, if the second data storage system 16 wishes to determine whether or not a particular track or record which has been requested is write-pending or has been migrated to the second system or of the status of some other attribute or characteristic, the data storage system 16 first determines which device or disk drive 17a–17n the data element is stored on and then checks the appropriate indicator flag bit for that device. If the particular indicator flag bit is not set for that device, then the second data storage system 16 knows immediately that no lower level storage unit or location such as a volume or track in that device has that attribute. If any lower data storage element in the hierarchical structure such as a track or volume includes the attribute, than the attribute or flag bit for the device will be set.

Similarly, if a particular data storage location such as a record or track which is part of a logical volume has the requested attribute, then the corresponding attribute or flag bit for the volume will be set. The data storage system 16 can thereby quickly determine whether any data storage location having a lower level than the volume or other similar logical or physical partition being examined has the particular attribute, without scanning or searching each and every lower level data storage location.

The "in-cache" flag or bit is an exception to the hierarchical structure in that since each line or entry 50–56 of the data map/table 24 is directly addressable, the second data storage system directly addresses the table entry line for a particular data element when it must inquire or "look-up" whether that particular data element is presently "in-cache". It is understood, however, that this flag or bit could be managed in a hierarchical fashion without departing from the scope of this invention.

In addition to the in-cache bit or flag 58 and the write pending flag or bit 61, the data map/table 24 which is one feature of the present invention includes, in the preferred embodiment, other flag bits 62 such as an invalid track format flag or bit, and an indication of whether or not data on a particular device, volume or track needs migration or has been migrated from the first to the second data storage system 14/16 respectively, as shown generally by flag or indicator bit 60.

Data map/table 24 may further include a physical address 64 entry for each element in the map or table 24, which identifies the beginning data address 64 at which the corresponding data element can be found on the disk drive 17a–17n of the new or second data storage system 16.

The operation of the method according to the present invention will be described in greater detail beginning with step 100, FIG. 3, wherein the second data storage system 16 receives a data element read or write request from the host or other data processing device 12, step 100. The method next determines if the request or command is a read or a write request, step 101. If the command is a read command, the channel handling process 25 of the second data storage system 16 next determines if the requested data is already stored in the second data storage system 16, step 102, by reading its data table map/table 24.

If the data is stored on the second data storage system, step 102, the second data storage system 16 will make the data available to the host or other requesting data processing device 12, step 104, and return to step 100 to await receipt of a new data read or write request.

If, however, at step 102, the second data storage system 16 determines that the data is not presently stored on the second data storage system 16, the second data storage system 16 will generate a request to the first data storage system 14 to read the data, step 106.

The command or request to read data from the first data storage system 14 takes the same form as a read data command which would be issued from the host 12. Thus, for example, if the host 12 is an IBM or IBM compatible host or data processing device, the second data storage system 16 will issue an IBM compatible "read" command to the first data storage system 14. The channel and migrate processes 25,27 of the second data storage system 16 maintain a list of commands native to the first data storage system 14 and can easily convert command types, if necessary, from a first command type issued by the host 12 and understood by the second data processing system 16, to a second command type understood by the first data storage system 14.

Subsequently, the second data storage system 16 receives the requested data from the first data storage system 14, step 108 and writes the data to the cache memory 18 of the second data storage system 16 while updating the data element map/table 24, step 110. The second data storage system 16 then provides an indication to the host or data processing device 12 that the data is ready to be read, step 112. Subsequently, the second data storage system 16 will write the data from cache memory 18 to a more permanent storage location, such as a disk drive, on the second data storage system 16, step 114, followed by a final update to one or more bits or flags of the data element map/table 24, step 116.

Thus, in the case where requested data is not yet stored on the second data storage system 16, the "read request" command from the host 12 results in the second data storage system 16 "migrating" the data from the first data storage system 14 to the second data storage system 16.

If the host or other data processing system 12 issues a write request or command, step 120, the channel process 25 of the second data storage system 16 determines if the data to be written has been previously migrated from the first to the second data storage system, step 122. If the data has been previously migrated, step 122, the second data storage system writes the data to cache and updates any necessary flags or bits in the data map/table 24, step 110. Processing continues as previously described.

If, however, the data has not been previously migrated, step 122, the method of the present invention next determines, by the type of command or request issued by the host (for example in the case of IBM host commands), whether or not the write request is for a full or complete data element storage location, such as a full or complete "track" of data, step 124. If the write request is for a full "track" or other similar type of data block or content, the second data storage system does not need to worry about migrating the date from the first data storage system 14 since all the "old" data is being replaced by the current command and therefore, processing continues to step 110 as previously described.

If however, the method determines that the write request is for less then a full or complete data block or confine, such as a track, step 124, the method next temporarily suspends handling of the write request, step 126 and issues a "read" command for the full or complete "track" to the first data storage system 14, and reads a predetermined amount of data (a whole track of data for example), step 128, and copies the full "track" of data to the cache memory 18 of the second data storage system 16. The new data to be written is then written into the proper memory location in cache memory 18 (the occurrence of the actual "write" command), the data table/map 24 updated (for example, to indicate that the data is in cache memory 18 [data in cache bit set], that a write is pending on this data [write pending bit set], and that the data elements have been migrated [data needs migration bits re-set]) and the host or other central processing unit 12 informed that the write command is complete.

At some later time, the data in cache memory 18 which has been flagged as write pending is copied to a more permanent storage location, such as a disk drive, and the write pending bit reset.

Typically, data write requests are performed to update only a portion of the total or complete number of data elements stored in a predetermined data storage element or physical/logical confine (such as a disk drive track). The present invention, however, also realizes that in some cases, such as when the host or data processing unit 12 provides an indication that both the data structure (format) as well as the actual data contents are to be updated, reading old data from the first data storage system 14 may be eliminated since all data and data format or structure will be updated with the new write request. Such a data and format write command is so infrequent, however, that the preferred embodiment contemplates that each write request will cause a write request to be read from the first data storage system 14.

The method of present invention also allows the second or new data storage system 16 to provide transparent or "background" data migration between the first data storage system 14 and the second data storage system 16 irrespective of or in parallel with the data transfer or migration caused by the channel process which is serving the "channel" between the host 12 and the second data storage system 16. Since the goal of providing the second or new data storage system 16 is to generally provide enhanced or increased capabilities to the host or other data processing system 12, it is therefore desirable to migrate the data as quickly yet as unobtrusively as possible from the first to the second data storage system.

Figure 4:
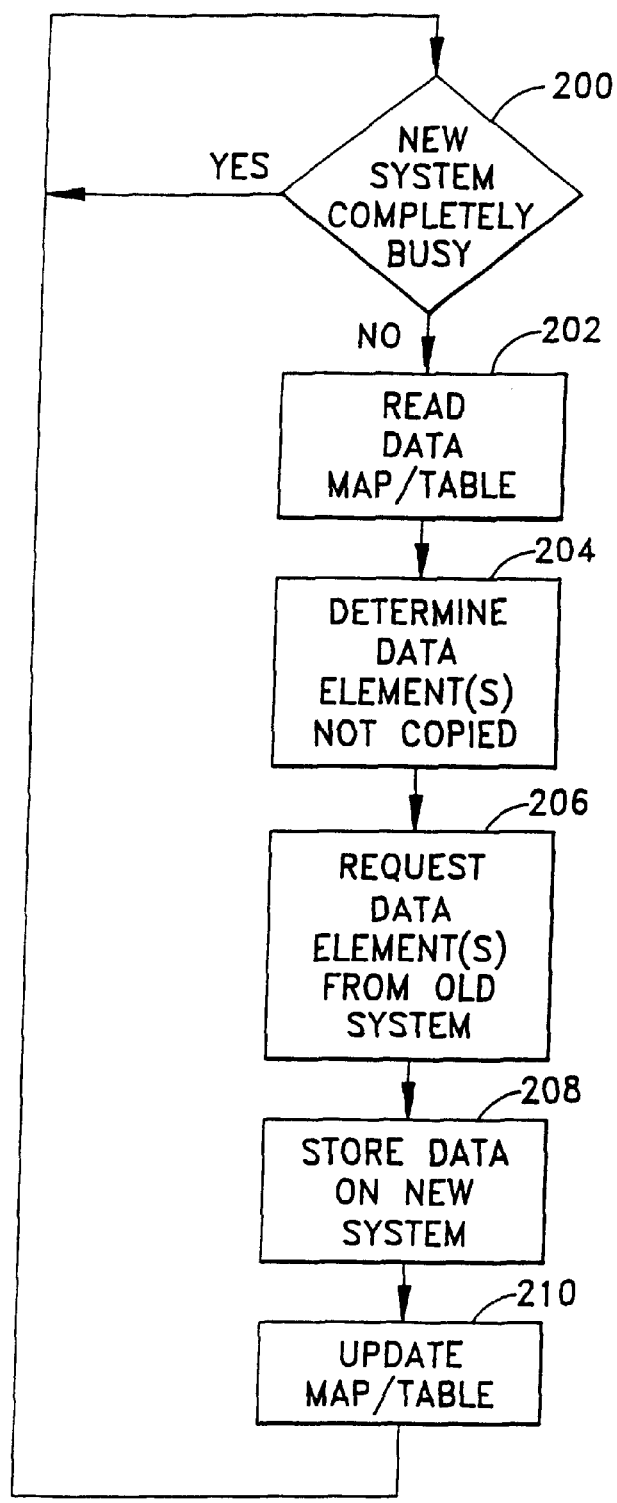
FIG. 4 is a flowchart illustrating the steps for providing data migration between first and second data storage systems without data storage device or host system intervention when the second data storage device is not busy handling data requests from the host or data processing device.

Thus, with the background migrate or copy "task" or "process" 27, the method of the present invention which is a series of software instructions executed by a central processing unit in the second data storage system 16 according to the present invention (such hardware and software as is well known in the art, see for example the EMC Symmetrix series 5500 data storage systems), the present method first determines whether the second data storage system 16 is completely busy servicing read or write data requests from the host or other connected data processing system 12, step 200, FIG. 4. If the second data storage system 16 is completely busy handling such requests to and from the host or data processing system 12 or completely busy handling other data input/output (I/O) operations in the second data storage system 16, further processing does not take place but instead the migrate process 27 awaits a "no busy" or "available" indication from the operating system of the second data storage system 16.

Once the second data storage system 16 is not busy handling internal input/output (I/O) requests or requests from the host or data processing device 12, the second data storage system 16 reads the data map/table 24, step 202 and determines which data elements have not been copied from the first data storage system 14 to the second data storage system 16, step 204.

As previously mentioned, during initial configuration of the second data storage system 16, before the second data storage system comes "on line", the user or system engineer will utilize a system configuration device 26, such as a personal computer or other input device, to configure at least a portion of the data storage locations 17a–17n in the second data storage system 16 to exactly emulate (i.e. have the same memory addresses) the data storage system configuration of the first or older data storage system 14. Generally, the new or second data storage system 16 will have a greater storage capacity than the first or "old" data storage system 14 and therefore, additional storage areas or locations will become available. Therefore, if the first data storage system 14 includes a predetermined number of drives or volumes, each drive or volume having a certain number of tracks or records, the second data storage system will be configured to imitate such a configuration.

Once the second data storage system 16 has determined that least one data element (such as a track) has not been copied from the old or first data storage system 14, the second data storage system 16 issues a request to the first data storage system 14 for the data element, step 206. Once received, the second data storage system 16 stores the data on the second data storage system 16 (typically in cache memory 18), step 208, updates the second data storage system data map/table 24, step 210, and returns to step 200 to determine whether or not there is a pending data read or write request from the host or other data processing system 12.

In one embodiment, the present invention contemplates that it may be desirable to "prefetch" data from the first data storage system 14 to the second data storage system 16. For example, the migrate or copy process 27 may, using commands native to the first data storage system 14, issue a prefetch or "sequential" data access request or command to the first data storage system 14, to cause the first data storage system 14 to continue to fetch or 'prefetch' a certain number of data elements to the cache memory 18 of the second data storage system 16. Such prefetching can significantly speed up the transfer of data between the first and second data storage systems 14,16 by greatly reducing the number of "read" commands which must be passed between the data storage systems.

In another embodiment, the migration process 27 may determine that one or more read requests from the host 12 are part of a sequence of such read requests. In such an instance, the channel process 27 may take the current address of data being requested by the host 12 and increase it by a predetermined number. For example, if the host 12 is currently requesting data from an address '411', the channel process 25 will issue a read request to the first data storage system 14 for the data at address 411. Generally simultaneously, the channel process will pass an indication to the migrate process 27 to begin prefetching or migrating data from address '413'. Thus, the migrate process 27 will be used to insure that the second data storage system 16 gets 'ahead' of the channel process 25 and the actual data requests from the first data storage system 14. The channel process 25 will handle requests from the host 12 for data at addresses 411 and 412. Subsequent requests will already be in cache in the second data storage system 16 and quickly handled by the second data storage system 16.

The foregoing description presents one embodiment of a unique data storage system and method that allows a new or second data storage system to be connected to an existing host or other data processing device with essentially no time lost in accessing the data stored on a first or donor data storage system. During the process there is real time, on-line availability of the data to the host or other connected data processing device, so normal operations of a data center can proceed. Data not involved with transfers to or from a host migrates to the new data storage system concurrently with on-line operations. In essence, FIGS. 1 through 4 depict one embodiment of a method and apparatus for connecting the new or replacement storage device to the host system with its existing or donor storage device to form a composite storage device. One transfer path enables transfers between the host system and the composite storage device. A data migration path migrates data from the existing storage device to the replacement storage device within the composite memory. A control in the replacement storage device controls the operation of the transfer path and data migration path until all data has migrated from the existing or donor storage device to the replacement storage device. Thereafter all host system transfer requests are processed in the replacement storage device and the existing or donor storage device can be removed from the system or assigned other functions.

ALTERNATE EMBODIMENTS

While the foregoing embodiment performs all these functions, the process of configuring a system such as by disconnecting the old data storage system 14 in FIG. 1 from the CPU/host 12 and connecting the CPU/host 12 to the new data storage system 16 takes some time, usually less than one hour, during which all applications must suspend operations. In some data centers such an interruption is not acceptable. In others, the preparation for such an interruption can represent a formidable task.

In some data centers the connections between a host and old data storage system may use only a portion of the available channels. For example, in some centers a host computer with four available channels might use only two channels for communicating with the old storage device 14. Such availability often exists when the old storage device 14 connects to multiple host computers or when a single host computer connects to multiple storage devices.

Figure 5:
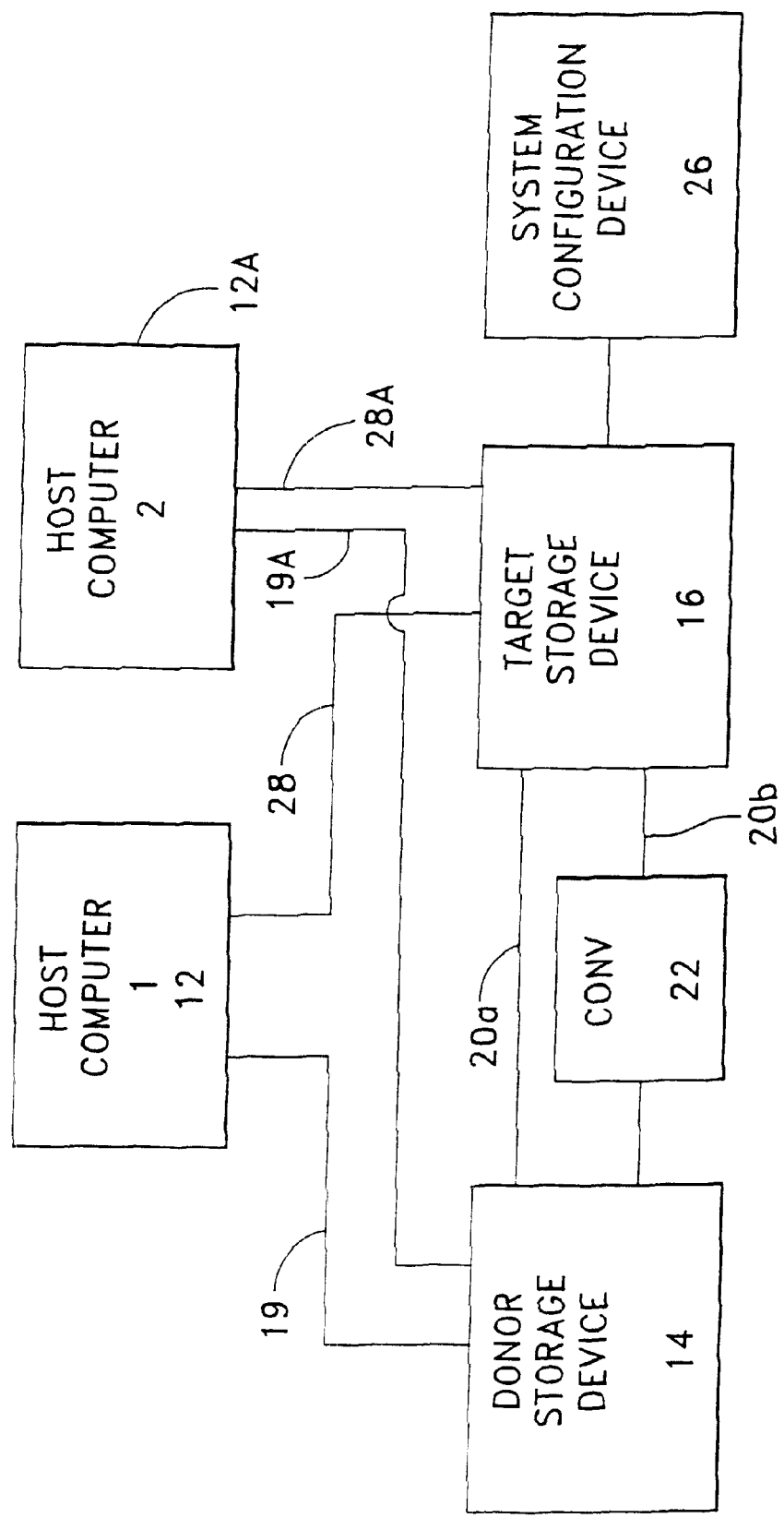
FIG. 5 is a schematic diagram of another embodiment of a data processing and data storage system on which the system and method for providing on-line, data transparent data migration between first and second data storage systems in accordance with the present invention may be accomplished.

FIG. 5 depicts one such system that includes the host computer 12, an old, or donor, storage device 14, and a new, or target, storage device 16, converter 22 and system configuration device 26 of FIG. 1. In FIG. 5 it is assumed that the connection 19 represents one channel and that there are four available channel interfaces on each of the host computer 12 and donor storage device 14. FIG. 5 also depicts a second host computer 12A with a connection 19A as a second channel between the host computer 12A and the donor storage device 14. In this particular configuration each of the host computers 12 and 12A have two available channels and, assuming each of the storage units has four available channel connections, each storage unit has two unused channels.

If such a configuration exists, then in accordance with another aspect of this invention, the composite storage device can be formed without any significant interruption of operations in the data center. The steps for performing such a non-disruptive transfer procedure begin with the connection of the target storage device 16 to available channels on the donor storage device 14 in the same fashion as previously indicated. However, the connection 19 remains intact while new connections 28 and 28A are established to the host computers 12 and 12A to unused paths or channels.

Figure 6:
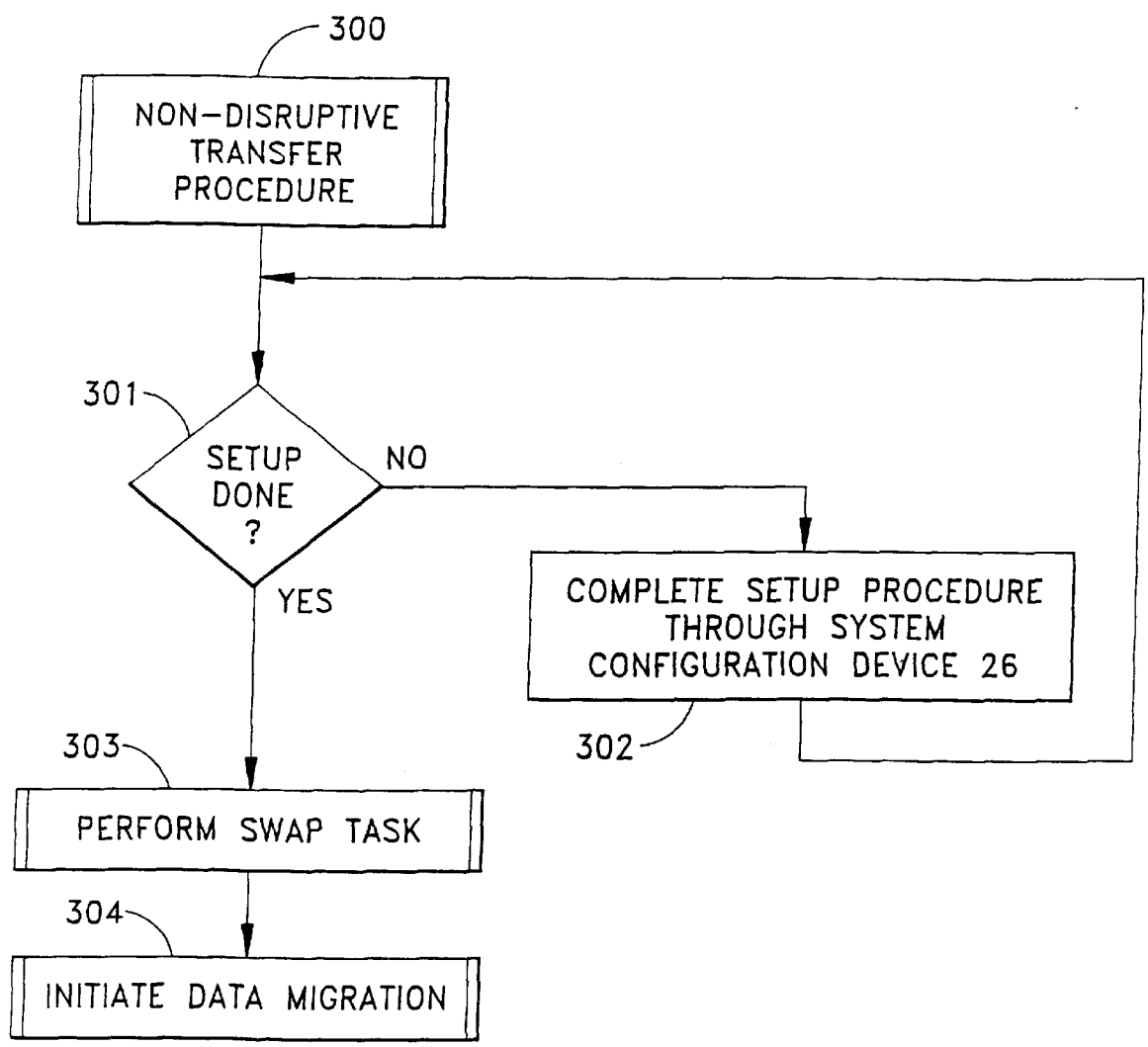
FIG. 6 is a flowchart illustrating the steps for connecting the second data storage system without interrupting the operation of the data processing system.

Once these connections are completed and the system configuration device 26 has properly configured the target storage device 16, a non-disruptive transfer procedure 300 shown in FIG. 6 begins. Step 301 verifies that all the appropriate steps have been completed to establish the appropriate configuration. If this is not done, step 301 diverts to step 302 to complete that procedure. When the setup is complete, step 301 diverts to procedure 303 that performs a swapping task so subsequent IO data transfer requests communicate through the paths 28 and 28A of FIG. 5 to the target storage device and do not communicate through the connections 19 and 19A. Step 304 in FIG. 6 represents the initiation of any of the previously or subsequently described data migration techniques.

Essentially it becomes necessary to interrupt the operation of the host computer 12 and any additional host computer, such as the host computer 12A, connected to the donor and target storage devices in order to swap the IO request from the donor storage device 14 to the target storage device 16. As known in the art, many data processing systems operate with an ability to run small batch programs with special instructions. One instruction for performing the swapping operation for an MVS system is:

S NDSDM, FROM=xxxx, TO=yyyy [SHARED=N/WTOR/CKPT] This command establishes a procedure and can be started from a main frame operator's console for each host computer attached to the donor storage device. The NDSDM field is a mnemonic indicating that a data migration swap is being implemented. The "FROM" parameter identifies the donor storage device 14 in FIG. 5; the "TO" parameter identifies the target storage device 16. The "SHARED" parameter can have three values. "N" indicates that there are no shared host computers. This would be applied in a system for a data center as shown in FIG. 1. If two host computers connect to the donor storage device, as shown in FIG. 5, the operator initiates the transfer by selecting either a WTOR or CKPT parameter in an effort to assure that the switch of data transfer requests from the donor storage device 14 to the target storage device 16 occurs in a timely and coordinated fashion.

Once the operator issues this command in step 305, as from the operator's console, step 306 determines whether the elements to be involved in the data migration are appropriate (i.e., have a valid configuration or syntax). Step 307 determines whether the "FROM" and "TO" volumes are valid. As previously indicated each storage device can comprise one or more logical volumes. Typically a data migration will be made on a volume-by-volume basis. Step 308 determines whether the "FROM" volume has any restrictions that preclude the data migration. If the volume is restricted, if the configuration is not valid or if either the "FROM" or "TO" volumes are not valid, step 309 terminates the task 303 and generates an appropriate error message.

Assuming these tests are met satisfactorily, control transfers to step 310 in which the operator, each of the computers 12 and 12A connected to the identified volumes suspends IO operations as by using standard MVS services to issue an IO ACTION STOP command. After this suspension occurs in step 310 the procedure 303 determines whether shared host computers are involved. If the data center has a configuration as shown in FIG. 1, step 311 determines that no sharing is involved and diverts control to step 312 that swaps the contents in the "FROM" and "TO" unit control blocks (UCB's). Then the system uses steps 313 and 314 to alter any duplicate volume identifications, typically by changing the identification of the volume in the donor storage device. This precludes multiple volumes with identical identifications. Once this is accomplished, step 315 reenables IO operations from the host computer 12. All subsequent data transfer requests are handled by the target storage device 16 over the connection 28.

Figure 7:
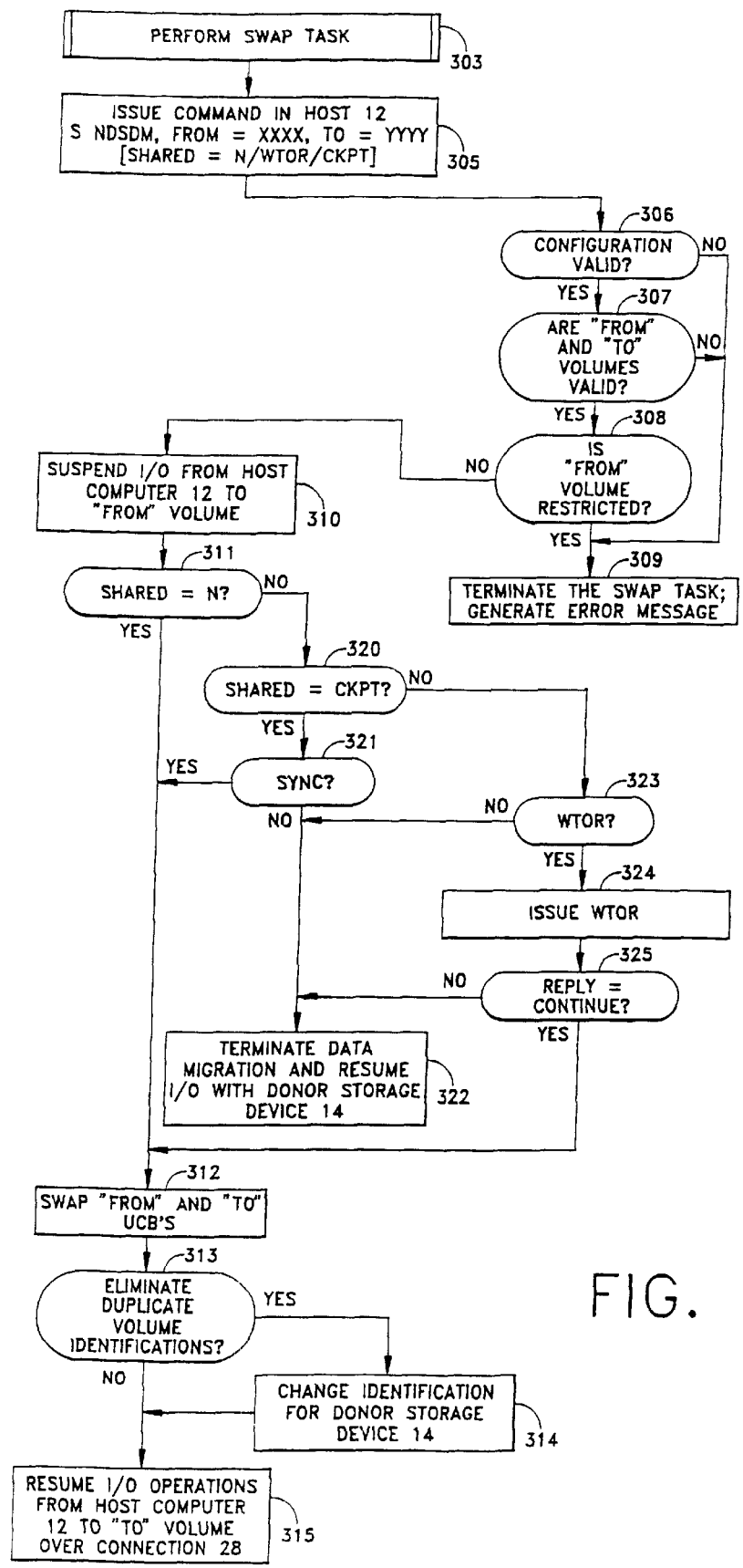
FIG. 7 is a detailed flowchart illustrating the steps of a procedure of FIG. 6.

If multiple host computers are involved, step 312 requires a prior synchronization or coordination to assure that the swap of the "FROM" and "TO" UCB's occurs in all host computers connected to the logical volume at the same time. This precludes a situation in which different host computers operate with both the donor storage device 14 and the target storage device 16. In one approach it may be possible to use services within the host computers to effect the synchronization. For example, check point services can synchronize events if an initialized control file on a separate device is shared by all the systems on-line to the FROM device. If this condition exists, the command issued in step 305 will incorporate the parameter SHARED=CKPT and operation will divert from step 311 to step 320 that initiates the operation. The procedure in FIG. 7 then awaits an indication of synchronization in step 321. If it is received within a predetermined time, control passes to step 312 to effect the switch over. If the synchronization does not occur within a particular time, then step 321 diverts to step 322 that terminates the data migration procedure by reenabling or resuming I/O operations with the donor storage device 14. Generally an error message also appears ant the operator's console. Step 322 also continues the processing of data transfer requests with the donor storage device 14.

A second approach enables the transfer to occur manually from the system consoles. In this case SHARED=WTOR and steps 311 and 320 divert to step 323. If the SHARED parameter does not have the WTOR value, then, in the sequence shown in FIG. 7, a potential error exists because none of the accepted SHARED parameters has been received. Control diverts to step 322.

When the WTOR value for the SHARED parameter is decoded, step 324 issues a WTOR (Write To OperatoR) command that establishes the necessary synchronization and returns a reply. Again this command must issue from all host computers that are sharing the donor storage device 14 or a volume in that device and target storage device 16. Each system responds to the receipt of the WTOR command by issuing an IO ACTION STOP command and then by issuing a reply. When the replies from all the hosts indicate that everything is satisfactory, operations can continue. Step 325 then diverts control to step 312. Otherwise step 325 diverts control to step 322. Thus the steps immediately after step 310 determine whether SHARED host computers are involved in the data migration. If they are, the operations are synchronized before the data migration begins. Once IO operations are reenabled or resume, all the host computers involved with the storage devices thereafter direct all data transfer requests to the target storage device 16 and the donor storage device 14 is effectively removed from the network.

As will be apparent, this procedure can be completed within a matter of seconds and therefore does not interrupt the operation of the data center. Further it enables the transfer to occur without any of the data center preparation steps that have been necessary in order to effect an orderly transfer with other transfer techniques.

Figure 8:
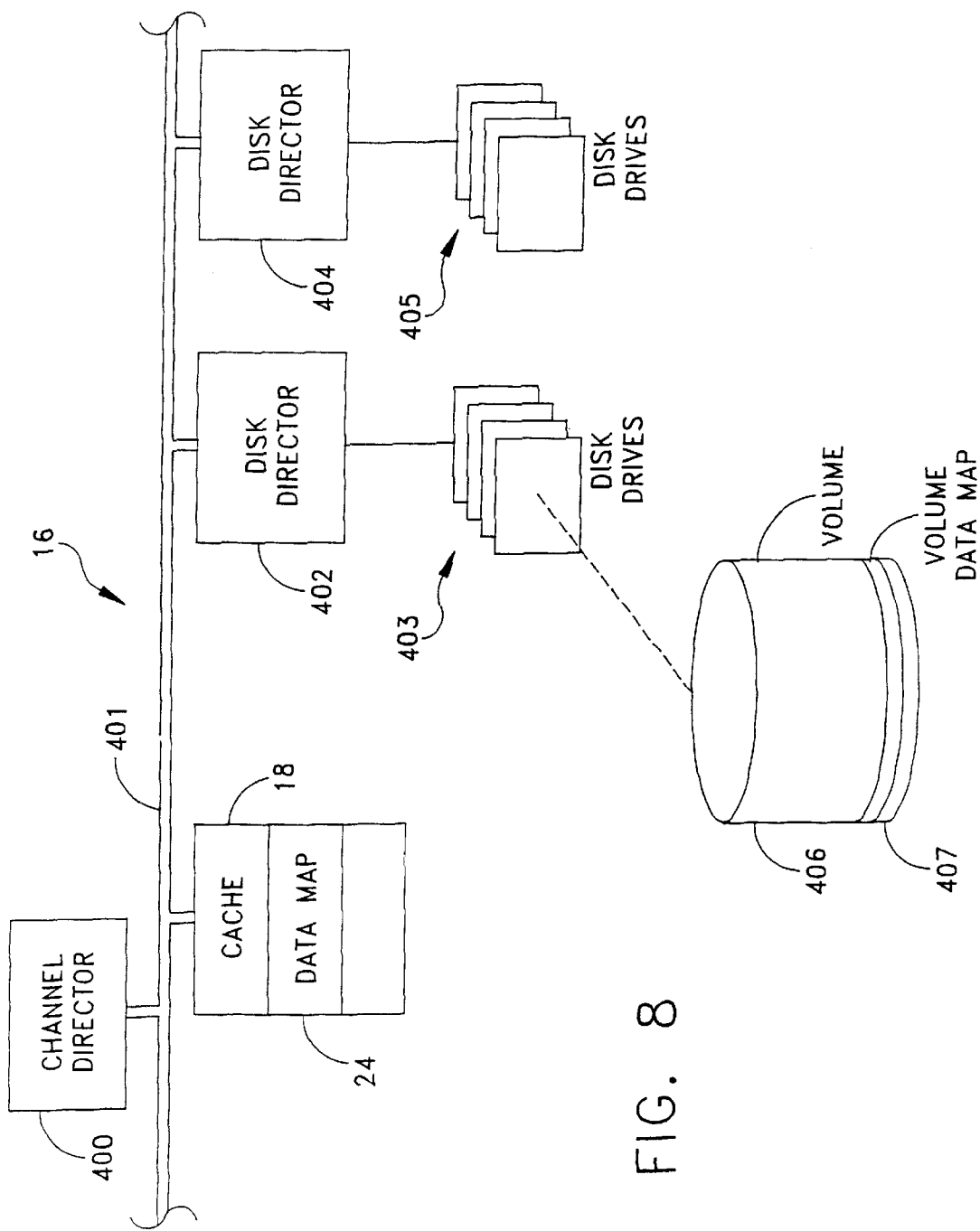
FIG. 8 is a schematic diagram of another embodiment of a data processing and data storage system incorporating this invention.

Another alternative embodiment of this invention that can enhance operations minimizes the impact of any power failure or other problem that might disrupt the data migration process. FIG. 8 depicts details of a system such as shown in FIG. 4 to particularly identify the new storage system with greater clarity. The new or target data storage unit 16 connects to a channel director 400 that in turn connects to one or more CPU/hosts 12 (not shown in FIG. 8). A common bus 401 then connects the cache memory 18 to disk directors. FIG. 8 depicts a first disk director 402 with disk drives 403; a second disk director 404 connects the bus 401 to disk drives 405. Each disk director controls operation of its attached array of disk drives. Each disk drive may comprise one or more logical volumes, one such volume 406 being shown as a component of one of the disks in the array 403.

As previously indicated the purpose of migrating data from the old data storage system 14 to the new data storage system 16 in FIG. 1 is generally to increase the size of the available storage. Consequently when it is desired to prevent any adverse response to a disruption during the data migration phase, each volume 403 will have a size sufficient to accept the data from the old data storage system 14 plus a volume data map depicted as a set of tracks 407 in the volume 406. The volume data map 407 will contain information as shown in FIG. 3 limited to that information corresponding to the particular disk drive and logical volume. Thus if the volume 406 corresponds to Volume 1 in Device X as shown in FIG. 2, the map 407 would contain information concerning tracks 1 through N as depicted in FIG. 2, but no information concerning any other volume or disk unit.

Figure 3:
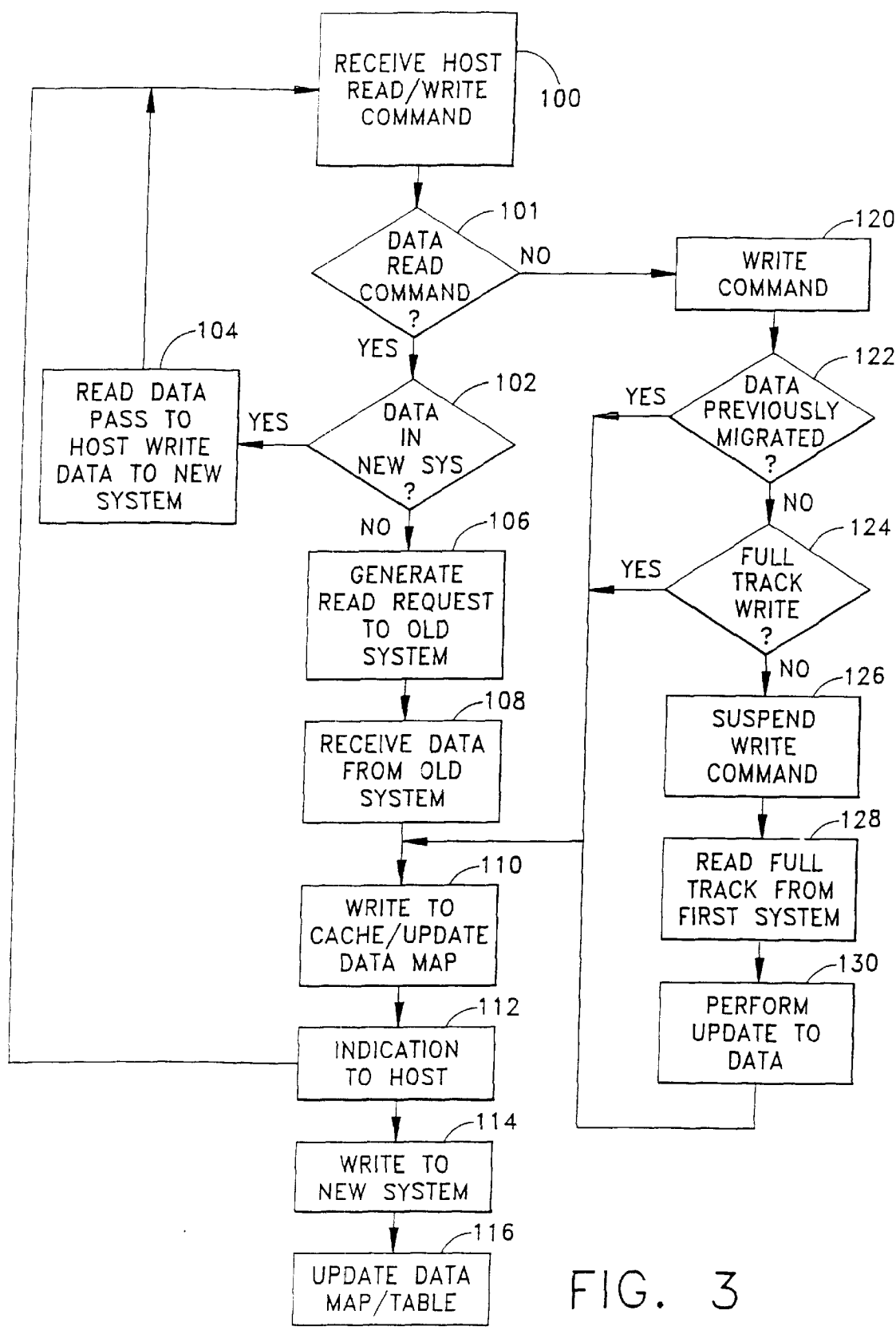
FIG. 3 is a flowchart outlining the steps of providing online, transparent data migration between first and second data storage systems according to the method of the present invention.
Figure 9:
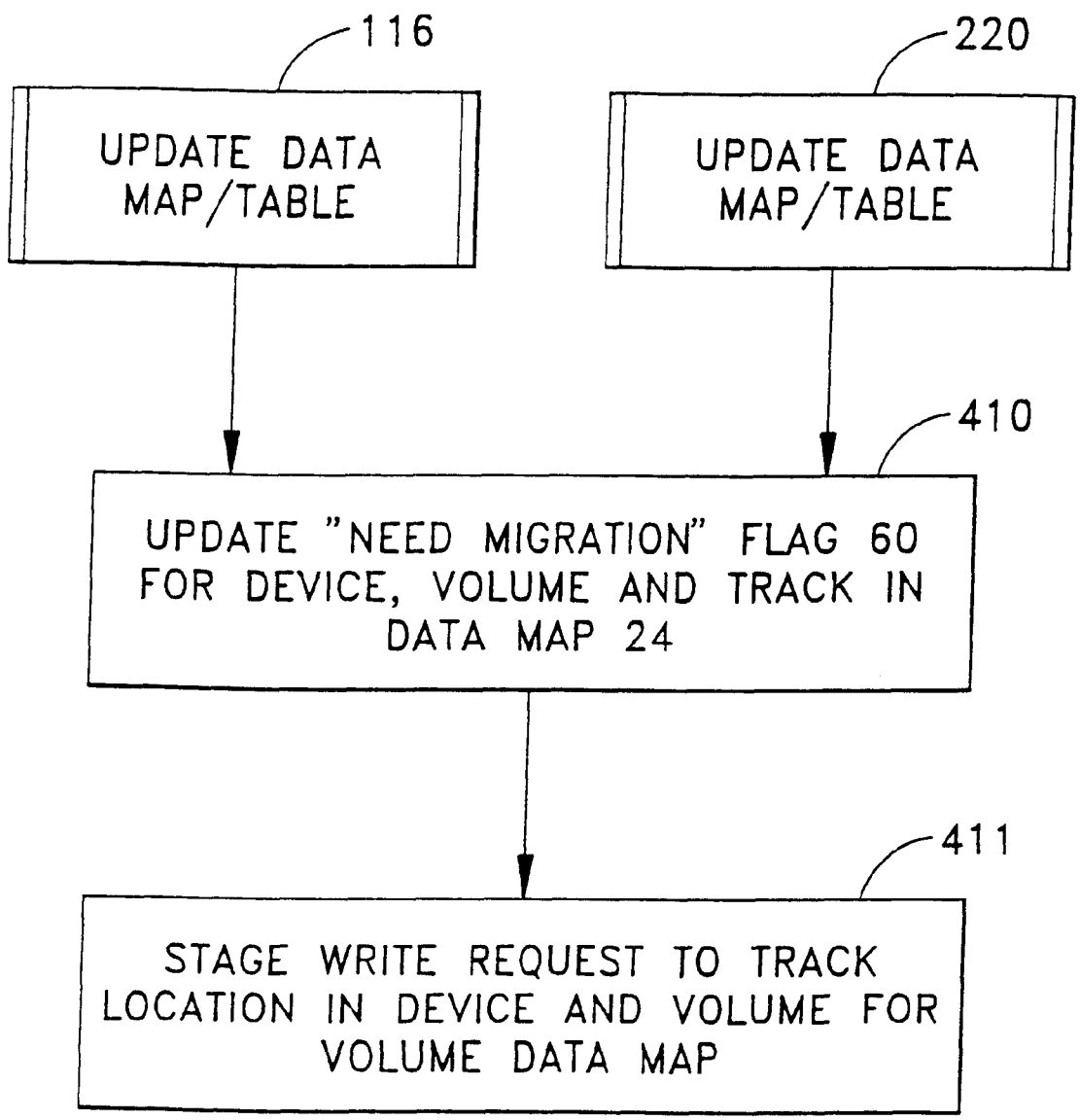
FIG. 9 is a flowchart illustrating the steps for shadowing the operation of the circuit in FIG. 8.

During data migration a data transfer request initiates an update data map/table procedure 116 in FIG. 3; the corresponding procedure 210 in FIG. 4 operates in the background modes. FIG. 9 depicts a detailed version of those procedures. In step 410 the procedure updates the "need migration" flag 60 for the corresponding device, volume and track in the data map 24 as previously indicated. In accordance with this aspect of the invention, another step 411 stages a write request to the volume data map 407. More specifically, if the NEED MIGRATION flag 60 in FIG. 2 were changed for any of the tracks in volume 1 in FIG. 2, step 411 would stage a write request to alter the corresponding NEED MIGRATION flag in the volume data map 407 of FIG. 8.

Thus in accordance with this aspect of the invention two copies of the data map table are maintained. The first is the complete data map table 24 in FIG. 2 that is stored in the cache 18 of FIG. 1. The second data map table is distributed among the volumes of disk arrays such as disk arrays 403 and 405. Consequently should any event occur, such as a power failure, that might cause the cache 18 to lose data or might corrupt data in the cache, it becomes a simple task to reconstruct the data map table 24 in the cache from the data that is permanently stored on the distributed volume data maps on the disks 403 and 405 and thereby continue the migration from the point at which the interruption occurred. This eliminates any need to migrate previously transferred valid data elements again.

As another alternative embodiment it is possible to modify the channel process 25 and migrate process 27 in FIG. 1 so that their respective operations are controlled in response to certain statistical information that can be developed during the migration process thereby to minimize response times to data transfer requests during the data migrations. In essence a copy subroutine runs in a background mode to transfer data track by track in sequence from a starting location until all the data is migrated. This operation corresponds to the operation of the migrate process 27 in FIG. 1. If the host processor 12 issues a data transfer request (DTR), including either a read or write command, and the corresponding data is not located in the target storage device 16, a foreground mode is established that causes the copy subroutine to transfer the requested data. This operation in this mode corresponds to the operation of the channel process 25 in FIG. 1. If a series of such data transfer requests establish a significant pattern of accesses to a localized area of the donor storage device 14, the parameters controlling the copy subroutine in the background mode are altered to shift the background copying to the localized area in which the statistically significant pattern of requests occurred.

Figure 10:
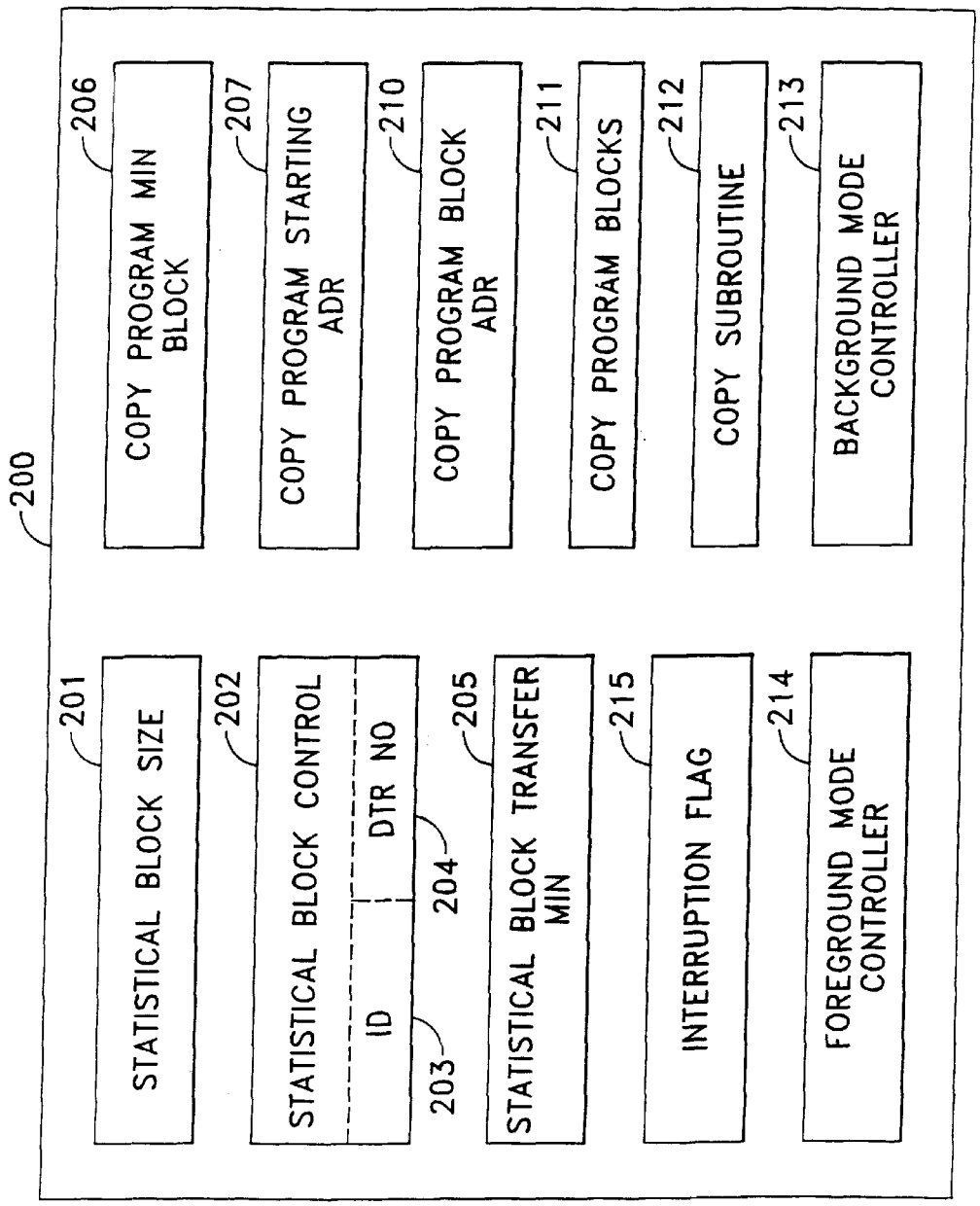
FIG. 10 depicts a set of registers that are useful in accordance with another aspect of this invention.

FIG. 10 depicts apparatus in the form of registers that implement this invention shown in a memory block 200; as will be apparent, the registers may be located at different locations within the data storage system 16 as part of the migrate process 27.

In the memory block 200 a STATISTICAL BLOCK SIZE register 201 records a number of consecutive blocks that will define a localized area. This is a fixed number that typically will be installed from the system configuration device 26.

A STATISTICAL BLOCK CONTROL register 202 includes an identification (ID) field 203 and a DTR NO field 204. The ID field 203 contains the identification of the statistical block currently being evaluated; the DTR NO field 204 acts as a counter that alters each time a data transfer request (DTR) is made to that statistical block. A STATISTICAL BLOCK TRANSFER MIN register 205, also set to an initial value by the system configuration device 26, defines a user-generated minimum number of consecutive data transfer requests needed to initiate a copy program transfer. That is, register 205 establishes a threshold value that defines the boundary between random accesses that cause no change in the operation during the background mode and repeated access that produce the background mode operating change.

A COPY PROGRAM MIN BLOCK register 206 stores a minimum number of blocks, such as data tracks on a disk, that should be moved before any relocation of the copy program can occur. Specifically, the number in this register establishes a dead band or minimum delay that must expire before the copy program can be moved in response to a series of DTR requests to another area.

A COPY PROGRAM STARTING ADR register 207 stores the starting address for the copy program. Typically this would be initialized to a first track.

A COPY PROGRAM BLOCK ADR register 210 stores the current block address being transferred by the copy program. Typically this will be a track identification. In a sequential mode this register will be incremented or decremented to point to a successive address location after each transfer is complete.

A COPY PROGRAM BLOCKS register 211 counts the number of blocks that have been transferred after the COPY PROGRAM STARTING ADR register 207 is updated or initialized. This controls the relocation of the program. It is set to the value stored in the COPY PROGRAM MIN BLOCK register 206.

The remaining elements in the memory block 200 of FIG. 10 include a copy subroutine 212, a background mode controller 213, a foreground mode controller 214 and an interruption flag 215. As will now be described, the controllers 213 and 214 establish and control the areas from which the copy subroutine in block 211 transfers data from the donor storage device 14 to the target storage device 16. The interruption flag 215 controls that transfer between modes.

Figure 11:
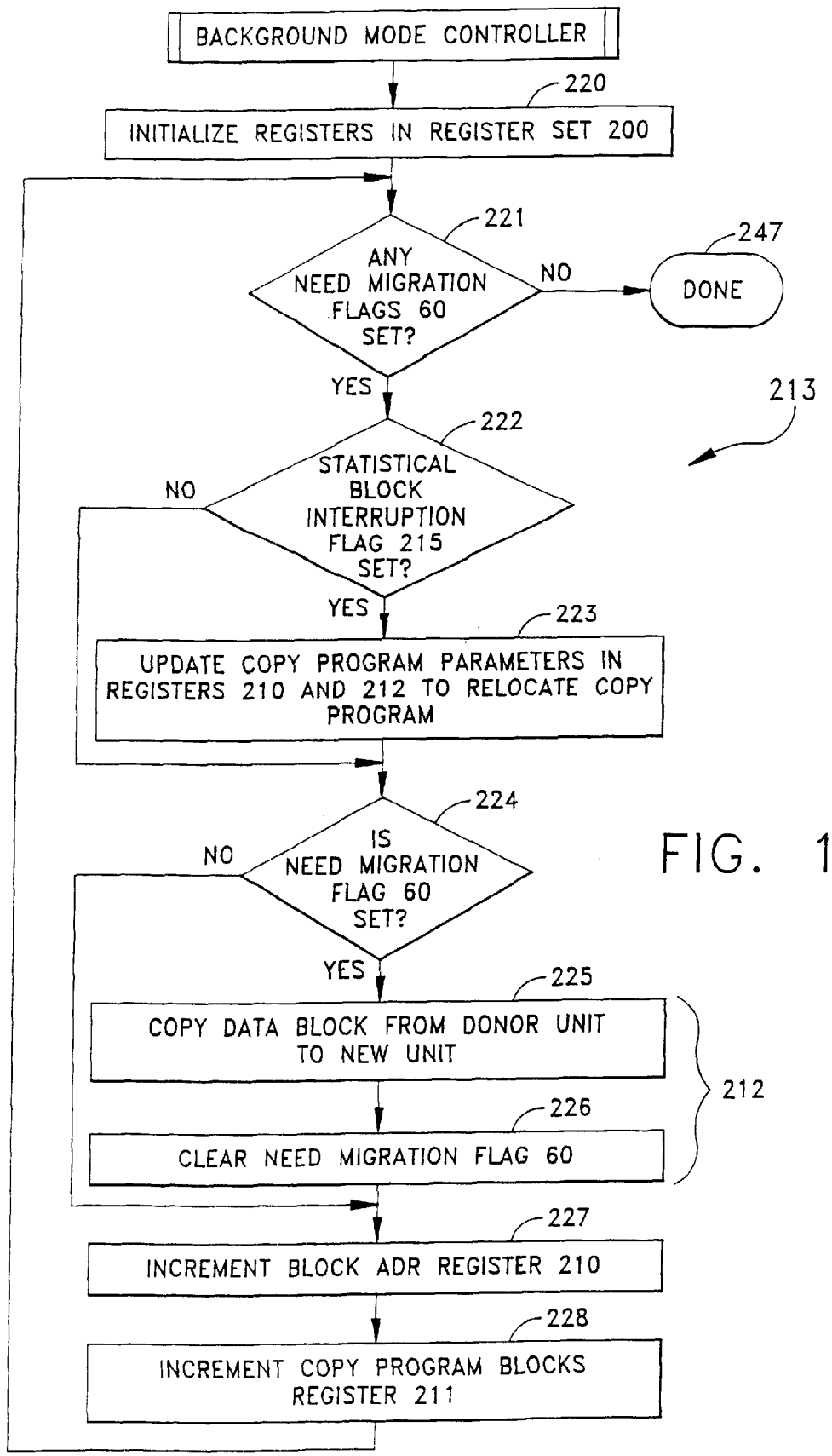
FIG. 11 is a flow chart of the steps for a copy block program operating in accordance with this other aspect of this invention.

FIG. 11 depicts the various steps by which the background mode controller 213 and the copy subroutine 212 interact to transfer data on a track-by-track basis. Registers in the register set 200 are set to initial values in step 220. Then the program enters a loop comprising the remaining steps in FIG. 11 until all the NEED MIGRATION flags 60 of FIG. 2 are set using step 221 as a loop control. As a first action in the loop, step 222 determines whether the STATISTICAL BLOCK INTERRUPTION flag 215 is set indicating that the copy subroutine 212 in FIG. 10 needs to be relocated. If that condition exists, control diverts to step 223 that updates the copy program parameters in registers 207 and 210 thereby to relocate the position of the copy subroutine to another track.

If the STATISTICAL BLOCK INTERRUPTION flag 206 is not set or after the copy program parameters are updated in step 223, step 224 determines whether the NEED MIGRATION flag 60 for the new track is set. If it is, step 225 copies the track, or other block of data elements, from the donor or first data storage device 14 to the target or second storage device 16. In step 226 the system clears the NEED MIGRATION flag 60 for the corresponding track position. Steps 225 and 226 form the copy subroutine 212. When the NEED MIGRATION flag 60 for a track is not set, the block has been previously transferred so control diverts from step 224 directly to step 227.

Step 227 increments the value in the COPY PROGRAM BLOCK ADR register 210 and step 228 increments the COPY PROGRAM BLOCKS register 211. Thus, the background mode controller 211 in FIG. 11 will, absent the setting of the STATISTICAL BLOCK INTERRUPTION flag 215, copy the tracks or data blocks from the donor storage device 14 to the target storage device 16 in an ordered sequence. Moreover the transfers are non-redundant because once a data block is transferred to the target storage device 16, all further DTR commands for a data element in that block are handled exclusively by the target storage device 16.

Figure 12:
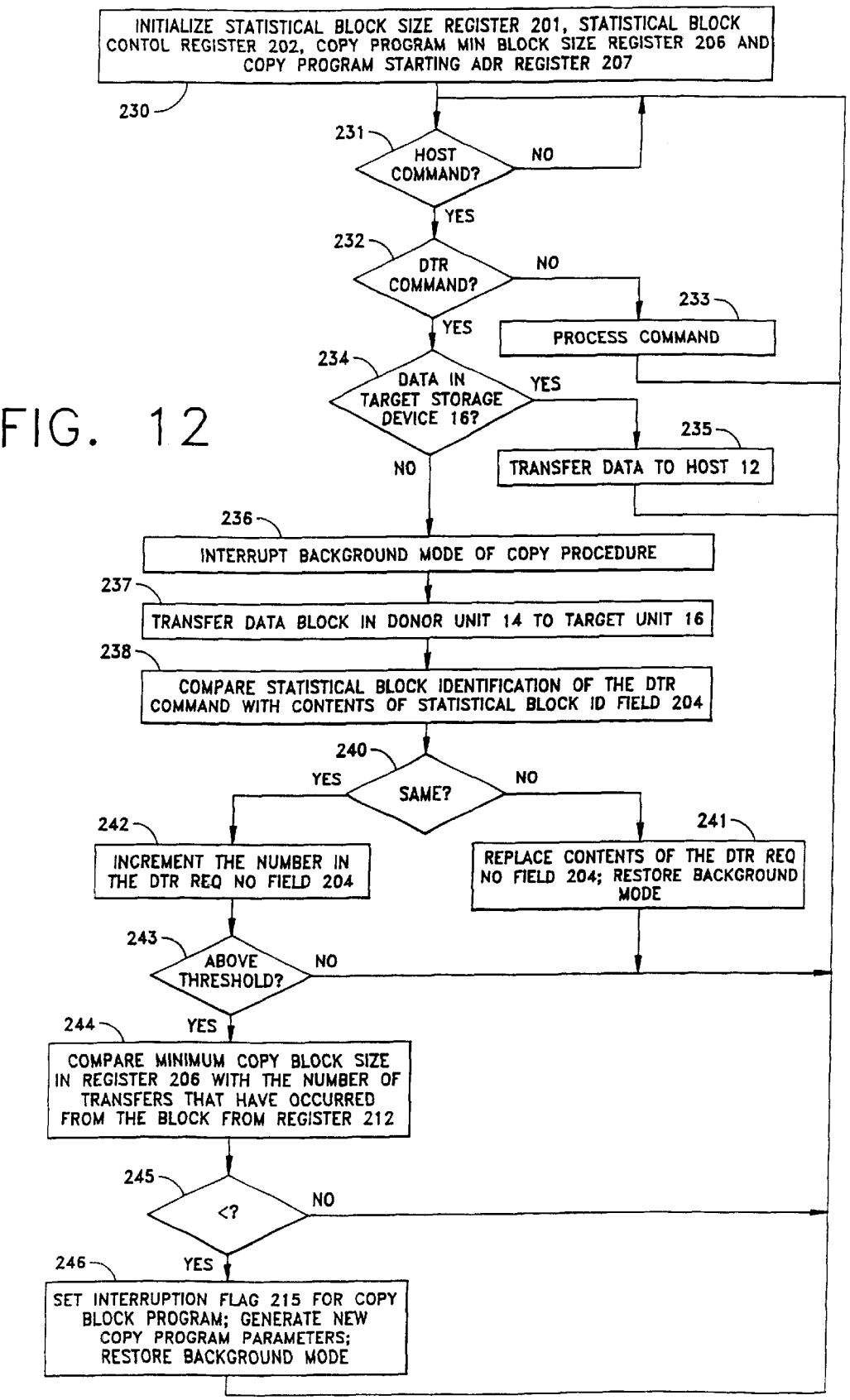
FIG. 12 is a flow chart of a program that controls an operating mode for the copy block program of FIG. 11.

FIG. 12 depicts the operation of the foreground mode controller 214 that controls the response to a DTR (data transfer request) command, makes any necessary transfer and determines whether the accesses define a significant pattern that warrants setting the STATISTICAL BLOCK INTERRUPTION flag 215. As part of an initialization procedure 230 in FIG. 12, the system will initialize (1) the statistical block size, (2) statistical block control ID and DTR NO values, (3) the copy program minimum block size and (4) the copy program starting position in the corresponding registers in block 200 of FIG. 10. Step 231 waits for a host command. When a host command is received, step 232 determines whether that command is a data transfer request (DTR) command. If not, step 232 branches to step 233 where the command is processed. Thereafter the system awaits the receipt of a next command at step 231.

Each time a DTR command is received, control branches from step 232 to step 234 to determine whether the target storage device 16 contains the requested data element. If it does, step 235 transfers the data element to the host computer in accordance with the DTR command. There is no requirement for any communication with the donor storage device 14. The response time then is the response time of the target storage device 16.

If the requested data element is not in the target storage device 16, migration is necessary. Step 236 interrupts the operation of the background mode controller 213 in FIG. 11 to transfer a track or other block containing the data element identified by the DTR command in step 237. In essence step 237 calls the copy subroutine 212 in FIG. 10 and supplies the arguments or parameters necessary to effect the transfer.

Next there is a determination of whether the access has established a significant pattern. In this particular embodiment, step 238 compares the statistical block identification associated with the DTR command with the ID field 203 in the STATISTICAL BLOCK CONTROL register 202. If the numbers are not the same, step 240 transfers control to step 241 that replaces the contents of the ID field 203 with the corresponding statistical block identification for the DTR command. Control then returns to await the next host command at step 231. Thus the foreground controller 214 follows control path through step 241 in response to random DTR accesses.

If the identification is the same as the identification in the field 203, step 240 branches to step 242. This branch represents an indication of localized access for this DTR command is to an area defined by the statistical block size in register 201 of FIG. 10. In step 242 the contents of the DTR NO field 204 are incremented. If the number in the field 204 is not above a threshold, step 243 diverts to loop back to await the next host command at step 231. If the number is above the threshold, indicating a significant pattern of accesses to a localized area, step 243 diverts to step 244 that compares the minimum copy block size in register 206 with the number of transfers that have occurred as obtained from register 211. If the minimum block size has not been satisfied, step 245 diverts back to step 231 to wait for the next host command. Thus no relocation of the copy subroutine 212 will occur until the minimum number of transfers has been made from an existing localized area. Once that minimum is reached, step 245 diverts to step 246 that sets the interruption flag 215. Step 215 also generates new copy program parameters and then restores the background mode of the copy procedure.

When the interruption flag 215 is set and the background mode controller 213 in FIG. 11 enhances a next iteration, step 222 determines that the interruption flag 215 is set and diverts control to step 223 to update the copy subroutine parameters or arguments with the new copy program parameters generated in step 246 of FIG. 12. This will relocate the copy subroutine to the statistical block corresponding to the localized area accessed by the sequential DTR commands. That is, the copy subroutine begins to transfer blocks or tracks sequentially from that initial operation at a first block or track in the new statistical block or localized area that exhibits the significant access pattern and continues transfers from that localized area until at least the minimum number of blocks have been transferred. The sequential transfer then continues until the DTR commands establish a statistically significant pattern of accesses within another statistical block.

To summarize the operation of this invention, the copy subroutine 212, essentially comprising steps 225 and 226 in FIG. 10, operates in response to calls from the background mode controller 213 of FIG. 11 to move data on a track-by-track, or other data block-by-data block basis, from the donor storage device 14 to the target storage device 16. If an occasional or random access is requested by a DTR command, the foreground mode controller 214 in FIG. 12 interrupts the operation of the background mode controller 213 in FIG. 11 to transfer the track or data block containing the requested data element to the target storage device 16. Thereafter control passes back to continue the copy subroutine calls from the background mode controller 213 according to the original sequence.

If, however, successive DTR commands cause the foreground mode controller 214 to access data blocks concentrated in a particular statistical block, the system predicts that further requests will be made to that statistical block. The foreground mode controller 214 in FIG. 12 then alters the arguments used by the background mode controller 213 in FIG. 11 to shift the operation of the background mode controller 213 to the statistical block receiving the repeated DTR requests. The minimum block size prevents another shift of that operation until such time as a minimum number of data blocks or tracks have been transferred. This process continues then until all the NEED MIGRATION FLAGS 60 have been cleared indicating that all the data has migrated. When this occurs, step 221 in FIG. 11 transfers control to a DONE procedure 247 that causes appropriate completion messages to be generated.

Figure 13:
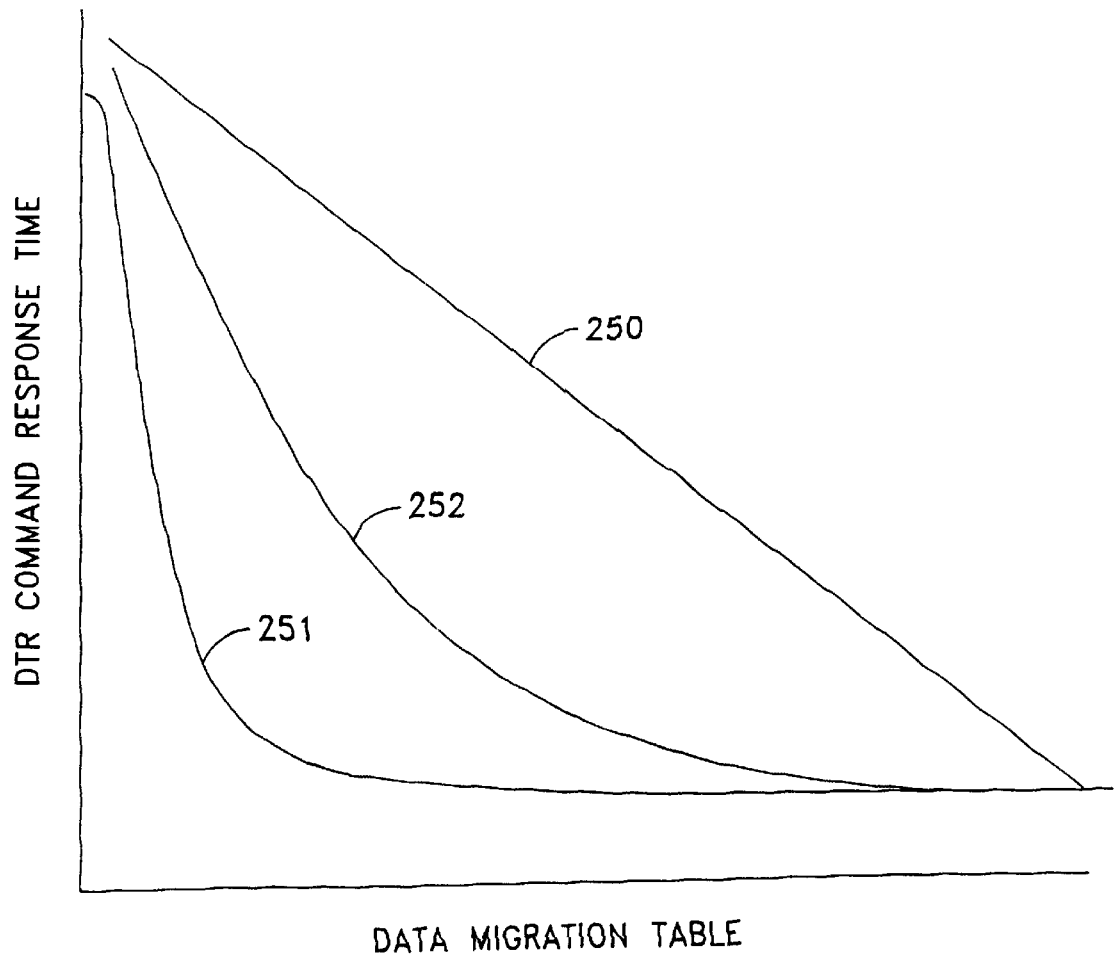
FIG. 13 graphically depicts the advantages of the implementation of FIGS. 10 through 12.

FIG. 13 depicts, in graphical form, the comparison of host computer response time to DTR commands as a function of data migration time. Graph 250 represents a typical response scenario for random access requests. The graph indicates that initially there will be maximum response times and that these response times will decrease to normal response times in a substantially linear fashion as the migration continues. The maximum response time represents the time required to complete a transfer from the donor storage device 14. Essentially and intuitively, as more data migrates to the target storage device 16 the more likely it is that a DTR command will access data already in the target storage device 16 so the response time will be that of the target storage device 16.

Graph 251 depicts an optimal data migration response curve. It is assumed for this curve that it would be possible to predict with certainty the locations accessed by the pattern of DTR commands. Relevant data is transferred initially so that the response time drops rapidly to the minimum value.

In actual practice it is not always possible to make such a prediction. Graph 252 depicts a typically observed response time pattern realized with this invention. It has been found that this invention significantly reduces the response times as a function of data migration over the graph 250. In many cases the actual response time graph approach the optimal graph 251.

Consequently this method and apparatus disclosed in FIGS. 10 through 12 enables the efficient transfer of data from one storage device to another in concert with other external operations as represented by DTR commands. The transfers are particularly efficient in a data migration scenario where the data migration occurs in a transparent or parallel mode and provides a minimal impact on response times to DTR commands.

Although the present invention is preferably implemented in software, this is not a limitation of the present invention as those well know in the art can appreciate that the present invention can be implemented in hardware of in various combinations of hardware and software, without departing from the scope of the invention. Modifications and substitutions by one of ordinary skill in the art are considered to be within the scope of the present invention which is not to be limited except by the claims which follow.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A system for on-line replacement of an existing first data storage device connected to said data processing device over a pre-existing data communication path by a replacement second data storage device, said pre-existing path being disconnected from the existing first data storage device and connected to the replacement second data storage device, and a second replacement data communication path being established between the existing and replacement storage devices, the replacement storage device including:

A) first mode means for migrating data elements from the existing to the replacement storage device over the second path in a first mode independently of and concurrently with processing of data by the data processing device and, B) second mode means operable in a second mode in response to commands received from the data processing device over the preexisting first path for accessing data elements yet to be migrated from the existing to the replacement storage device over the second path, whereby said first and second mode means perform transfers over the second path until all the data elements required for access by the data processing device have migrated to the replacement storage device whereupon thereafter all commands from the data processing device are processed in the replacement storage device and interaction with the existing first data storage device ceases.

2. The system of claim 1 wherein the existing first storage device stores data elements in sequentially addressed locations defining a data block, wherein each of said first and second mode means transfers a data block from the existing storage device to the replacement storage device and wherein the replacement storage device additionally includes:

i) a data element map which is initialized to indicate that all data blocks in the existing storage device require data migration, and ii) map updating means for updating said data element map in response to each data block migration thereby to terminate the data migration when all data elements required for access by the data processing device have migrated to the replacement storage device.

3. The system of claim 2 wherein said replacement second data storage device includes means for copying data from a first location to a second location in response to control parameters including an identification of the first and second locations, each of said first and second mode means identifying data blocks in the existing first storage device as first locations and locations in the replacement storage device as second locations, said first mode means including a background mode control for establishing first values of others of the control parameters and said second mode means including foreground mode control for establishing second values for the others of the control parameters in response to commands received from the data processing device to access data blocks located only in the existing storage device.

4. A method for providing on-line, transparent data migration from a first data storage device that is an existing data storage device connected to said data processing device over a pre-existing data communication path to a second data storage device that is a replacement for said first data storage device, the method comprising the steps of:

A) connecting said existing first and replacement second data storage devices with a first data communication path between said data processing device and said replacement second data storage device and with a second data communication path between said existing first and replacement second data storage devices;

B) establishing a first mode of operation of the replacement second data storage device for migrating data elements from addressed storage locations in said existing first data storage device over said second path to addressed storage locations in said replacement second data storage device independently of operations of said data processing device, and C) establishing a second mode of operation of the replacement second data storage device in response to a read or write command from said data processing device over said first path determining whether a data element in an addressed storage location identified in the command has already been migrated to said replacement second data storage device and if it has yet to be migrated, causing a migration of the data element in the addressed storage location in said existing first data storage device to a corresponding addressed storage location in said replacement second data storage device over said second path and recording the migration of each data element.

5. The method of claim 4 including the step of, prior to coupling said second data storage device to said data processing device by said first path performing the step of uncoupling said pre-existing path between said first data storage device and said data processing device.

6. The method of claim 4 wherein said second data storage device includes a data element map providing an indication of whether a data element having a predetermined addressed storage location identified in the command is stored in said second data storage device, said method including in the second mode the steps of:

i) receiving in said second data storage device over said first path from said data processing device a data transfer command comprising a data element read or write request regarding at least one data element stored at a predetermined addressed storage location in said first data storage device, ii) accessing said data element map by said second data storage device to determine if said at least one data element is stored in said second data storage device; and iii) responding to said accessing by causing migration of said at least one data element from said first to said second data storage device over said second path and recording the migration of said at least one data element by updating the data element map.

7. The method of claim 6 wherein the response to the receipt of a data read request by the storage device includes the steps of:

i) determining whether a data element identified by the data read request is stored in said second data storage device;

ii) if the requested data element is stored in said second data storage device providing the requested data element to the data processing device over said first path from the second data storage device; and iii) if the requested one data element is not stored in said second data storage device transferring the data element from the first data storage device to a corresponding location in said second data storage device over said second path providing the requested data element to the data processing device over the first path from the second data storage device.

8. The method of claim 6 wherein the response to the receipt of a data write request by the second storage device includes the steps of:

i) determining whether a data element has previously been transferred from the first to the second data storage device;

ii) if the transfer has occurred, writing the data element from said data processing device over said first path;

iii) if the transfer has yet to occur, transferring the data element from the first data storage device to the second data storage device over the second path and thereafter writing the data element to the second data storage device over the first path.

9. The method of claim 6 further including the steps of determining that the second data storage device is not completely busy responding to data element read or write requests from the data processing device, determining from the data element map which data elements stored in the first data storage device have yet to be migrated to the second data storage device, and transferring the yet to be migrated data elements to the second data storage device from the first data storage device and updating the data element map to indicate that the data element migration has occurred.

10. The method of claim 4 further including the steps of performing the first and second mode migrations over the second path until all the data elements required for access by the data processing device have migrated to the second data storage device whereupon thereafter all commands from the data processing device are processed by the second data storage device.

11. The method of claim 10 wherein the first data storage device stores data elements in sequentially addressed locations defining a data block, wherein each of said first and second mode migrations transfers a data block from the first data storage device to the second data storage device and wherein the second data storage device includes a data map which is initialized to indicate that all data blocks in the first data storage device require data migration, and is updated in response to each data block migration thereby to terminate the data migration when all data elements required for access by the data processing device have migrated to the second data storage device.

12. The method of claim 11 wherein said first and second mode migrations are effected by controlling the operation of a copy subroutine for transferring data blocks from the first to the second data storage device in response to control parameters, said first mode migration including background mode control for establishing first values of the control parameters, and said second mode migration including foreground mode control for establishing second values for the control parameters in response to commands issued by the data processing device to access data blocks located only in the first storage device.

13. In a data processing system including a first data storage device holding data comprising a plurality of data elements in a plurality of addressed storage locations and a data processing device for issuing read and write data transfer commands to said first data storage device and other system devices, said commands for said first data storage device identifying specific ones of said addressed storage locations, apparatus for providing an on-line transparent data migration to a second data storage device for holding data elements in a plurality of addressed storage locations, said apparatus additionally comprises:

A) means for interposing said second data storage device between the data processing system and the first data storage device whereby data transfer commands previously issued to the first data storage device are issued to said second data storage device, B) means for transferring data elements from the first data storage device to said second data storage device independently of operations of the data processing system, C) command responsive means responsive to a read or write command issued from the data processing device for determining whether a predetermined data element in an addressed storage location identified in the command is stored in said second data storage device and, if it has yet to be stored, migrating the data element in the corresponding addressed storage location in the first data storage device to said second data storage device, D) means for recording the migration of each data element by said transfer means and said command responsive means.

14. The system of claim 13 wherein said second data storage device includes a data element map for recording the migration of each data element for each of the first and second data storage devices.

15. The system of claim 14 wherein said second data storage device is responsive to a read command for a predetermined data element received from said data processing device and to an indication in said data element map that said predetermined data element is yet to be stored in said second data storage device for causing the said predetermined data element in said first data storage device to be migrated to said second data storage device and for updating the recording of the migration in said data element map.

16. The system of claim 15 wherein said second data storage device is operable to cause the transfer of a plurality of predetermined data elements from said first data storage device to said second data storage device.

17. The system of any of claim 14 wherein said second data storage device is responsive to an indication that said data write command received from said data processing device is for data to be stored in a portion of the addressed storage location for a data element, for causing a data migration of the data element in the addressed storage location in said first data storage device to the addressed storage location in the second data storage device and thereafter transferring the data to the addressed storage location in the second, data storage device.

18. The system of any of claim 14 wherein said second data storage device is responsive to an indication that said data write command received from said data processing device is for a predetermined data element for being stored in the addressed storage location, for writing said received data element to said second data storage device and updating the migration recording in the data element map.

* * * * *